United States Statutory Invention Registration [19]

[11] Reg. Number: H279

Roecker [43] Published: Jun. 2, 1987

[54] METHOD FOR INTERPRETING YAW DATA IN A PROJECTILE TRAVERSING A RESISTING MEDIUM

[75] Inventor: Eugene T. Roecker, Churchville, Md.

[73] Assignee: The United States of America as represented by the Secretary of the Army, Washington, D.C.

[21] Appl. No.: 852,463

[22] Filed: Apr. 4, 1986

[51] Int. Cl.[4] ..... G01L 5/14

[52] U.S. Cl. ..... 73/167; 102/293

*Primary Examiner*—Charles T. Jordan

*Attorney, Agent, or Firm*—Anthony T. Lane; Harold H. Card, Jr.; Michael C. Sachs

[57] ABSTRACT

Snapshot data from a projectile traversing a resisting medium are analyzed to determine a lower critical value within the resisting medium where rapid yaw growth begins and a yaw-growth constant governing yaw growth from the lower critical value to an upper critical value. Snapshot data from additional projectiles are similarly analyzed. Curves produced by the solution of a differential equation, including the lower critical value and the yaw-growth constant, are overlaid graphically or analytically to provide an increased data density sufficient to improve substantially the ability to predict the yaw performance of the projectile.

9 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

160
YAW
(DEG.)
100
10
20
30
35
PENETRATION
(CALIBERS)

160
YAW
(DEG.)
100
10
20
30
35
PENETRATION
(CALIBERS)

160
YAW
(DEG.)
100
10
20
30
35
PENETRATION
(CALIBERS)

METHOD FOR INTERPRETING YAW DATA IN A PROJECTILE TRAVERSING A RESISTING MEDIUM

GOVERNMENTAL INTEREST

The invention described herein may be manufactured, used and licensed by or for the Government for Governmental purposes without the payment to me of any royalties thereon.

BACKGROUND OF THE INVENTION

The present invention relates to techniques for interpreting data from measurements in which the data density available from a single measurement is too sparse to provide an understanding of the underlying process being measured.

Measurements of high-speed ballistic projectiles, traversing a resisting medium are conventionally performed using high-speed optical and X-ray cameras taking snapshots of the projectile at a few discrete points in its travel. In practice, about four or five snapshots can be obtained for a single traversal.

The manner in which the yaw of a projectile grows during traversal is of interest to weapon designers. It is desired to interpret snapshot measurement data of a traversing projectile in a way permitting an understanding of yaw growth with sufficient detail to permit analysis of factors affecting it and for enabling mathematical modeling of the yaw growth. The sparsity of data points measurable from a single projectile does not enable the desired understanding. An attempt to average the data points from several projectiles at corresponding points within the medium fails to yield a useful result since the position within the medium where significant yaw growth begins is subject to many variables outside the control of the experimenter.

OBJECTS AND SUMMARY OF THE INVENTION

Accordingly, it is an object of the invention to provide a data-interpretation technique which solves the problems of the prior art.

More particularly, it is an object of the invention to provide a data-interpretation technique for a projectile traversing a resisting medium which permits the development of a density of measurement points sufficient to foster an understanding of the underlying process.

It is a further object of the invention to provide a technique permitting the combination of snapshot measurements from separate projectile traversals of a resisting medium to provide a consistent set of data points having a density sufficient for supporting an understanding of the principles of yaw growth.

Briefly stated, the present invention provides a technique for analyzing snapshot data from a projectile traversing a resisting medium. The sparse data points are analyzed to determine a lower critical value within the resisting medium where rapid yaw growth begins and a yaw-growth constant governing yaw growth from the lower critical value to an upper critical value. Snapshot data from additional projectiles are similarly analyzed. Curves produced by the solution of a differential equation, including the lower critical value and the yaw-growth constant, are overlaid graphically or analytically to provide an increased data density sufficient to improve substantially the ability to predict the yaw performance of the projectile.

According to an embodiment of the invention, there is provided a method for interpreting yaw data in a projectile traversing a medium comprising the steps of: firing a first projectile through the medium, taking a first plurality of measurements of position and yaw angle of the first projectile during its travel through the medium, solving an equation for the yaw angle using at least some of the first plurality of measurements to derive a first critical lower value of the yaw angle and a first yaw angle constant for the first projectile, firing a second projectile through the medium, taking a second plurality of measurements of position and yaw angle of the second projectile during its travel through the medium, solving the equation for the yaw angle using at least some of the second plurality of measurements to derive a second critical lower value of the yaw angle and a second yaw angle constant for the second projectile, and overlaying the second critical lower value on the first critical lower value to produce a composite curve containing the first and second pluralities of measurements.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
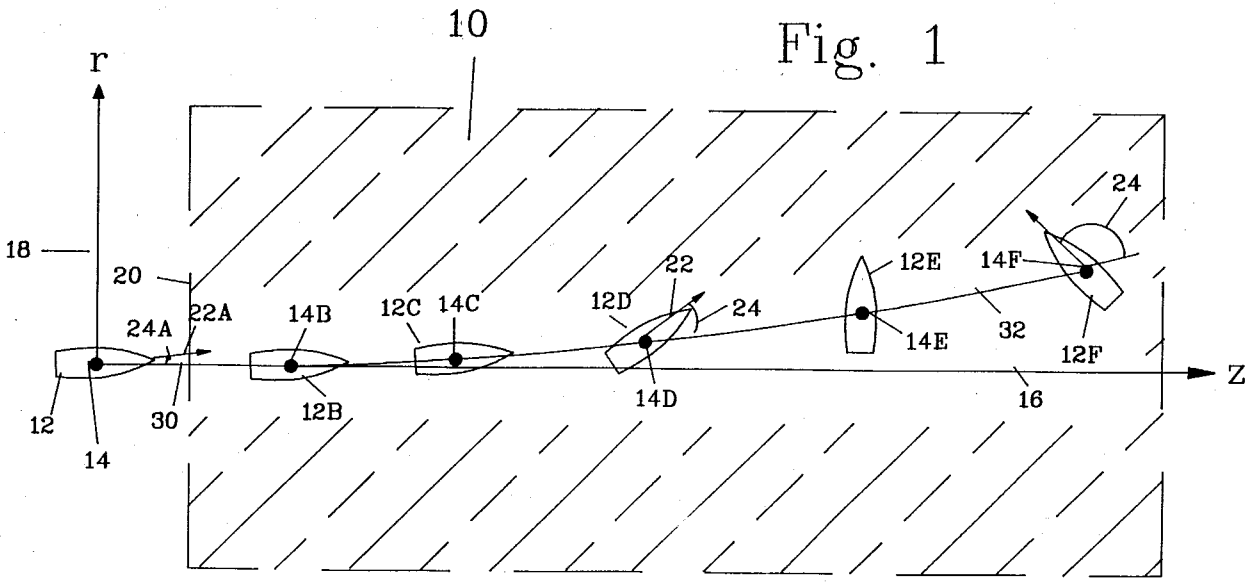
FIG. 1 is a schematic diagram showing several stages in the penetration of a resisting medium by a projectile.

Referring to FIG. 1, a resisting medium 10 is interposed in the path of a projectile 12 which may be, for example, a bullet. An original direction of flight of a center of mass 14 of projectile 12 before it enters resisting medium 10 is indicated by a z axis 16. An r axis 18 is defined normal to z axis 16.

Resisting medium 10 includes a penetration surface 20 through which projectile 12 enters. Resisting medium 10 may be any convenient material such as, for example, water, loose earth or hydrocarbon materials. In the preferred embodiment, resisting medium 10 is a block of transparent gelatin material chosen because of its uniform resistance to the passage of projectile 12 and for its light transparency which permits taking optical photographs. In addition, since a block of gelatin material can be self supporting, resisting medium 10 needs no container. When non-self-supporting materials are employed in resisting medium 10, a suitable container is required.

Figure 2:
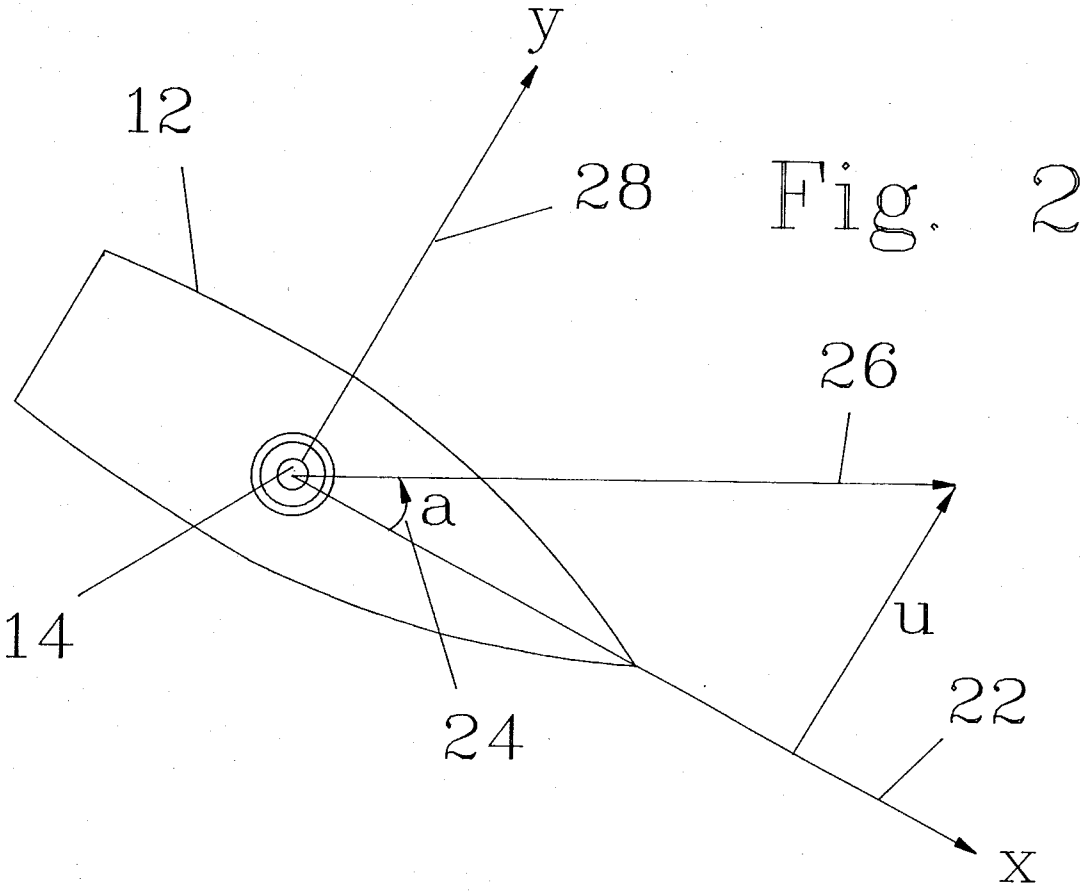
FIG. 2 is an enlarged view of a projectile of FIG. 1.

Referring now to FIG. 2, longitudinal axis of projectile 12, represented by an x axis 22, is inclined by a yaw angle a 24 to the instantaneous velocity vector represented by a velocity vector axis V 26. A y axis 28 is defined normal to x axis 22.

Prior to reaching a point of penetration 30 on penetration surface 20, velocity vector axis V 26 coincides with z axis 16. At penetration, an initial yaw angle a 24A (FIG. 1) exists due to precession, cross-track velocity or wobble developed in the external path of projectile 12. In addition, the plane of penetration surface 20 may depart from normal to z axis 16 and velocity vector axis V 26 at the moment of entry. All of these factors, which cannot be explicitly measured or predicted for a particular penetration, have a profound effect on the desired yaw measurements.

During an initial range of travel to a position indicated by the suffix B, center of mass 14 of projectile 12 generally follows z axis 16 with a slowly growing yaw angle a 24. At some critical value, the slow growth of yaw angle a 24 changes to a rapid growth such as indicated at successive positions of center of mass 14 and projectile 12 indicated by the suffixes C and D. Projectile 12 develops lift which bends the path of projectile 12 along a curved path whose tangent represents the local direction of velocity vector axis V 26. Yaw angle a 24 may grow to exceed 90 degrees as indicated at positions of center of mass 14 and projecticle 12 indicated by the suffixes E and F.

I have discovered that a yaw angle a 24 of 90 degrees is a stable condition and that growth of yaw angle a 24 slows or even reverses after reaching a maximum value. The greatly increased drag as yaw angle a 24 approaches 90 degrees may prevent growth of yaw angle a 24 to its maximum value. I have observed that a reversal in the growth of yaw angle a 24 sometimes does occur and such occurrence complicates the interpretation of the measured data.

Figure 3:
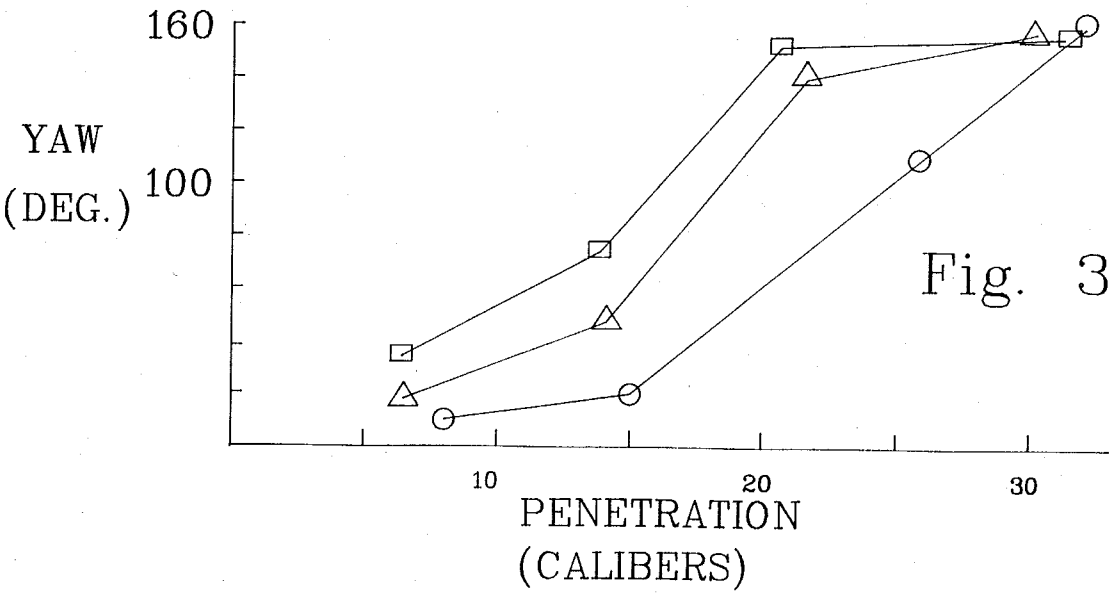
FIG. 3 is a set of curves drawn between data points of three sets of measurements of yaw of separate projectiles traversing a resisting medium.

Referring now to FIG. 3, typical data points of yaw versus penetration distance as measured by high-speed photography for three projectiles with the points joined by lines. It will be noted that the curves fail to overlie each other. I have discovered that the conventional technique of averaging the yaw values at selected values of penetration does not yield a result leading to understanding the yaw phenomenon, nor provide guidance for developing a mathematical model.

Figure 4A:
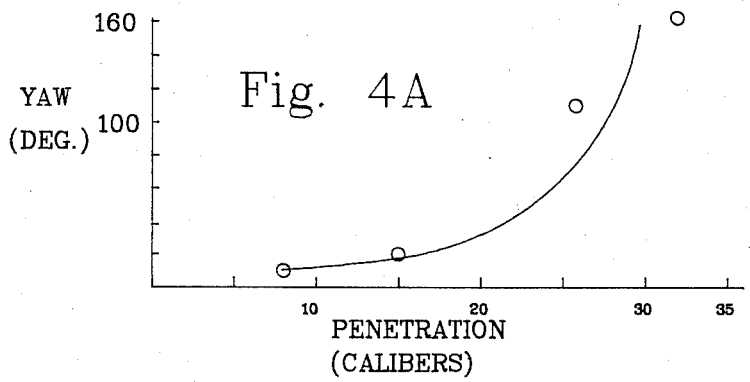
FIGS. 4A, 4B and 4C are curves derived from the three sets of measurements of FIG. 3 by the solutions of an equation based on the data points.
Figure 4C:
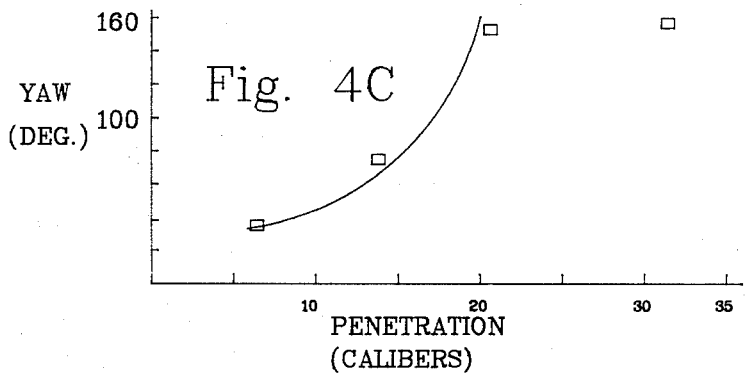
Figure 4B:
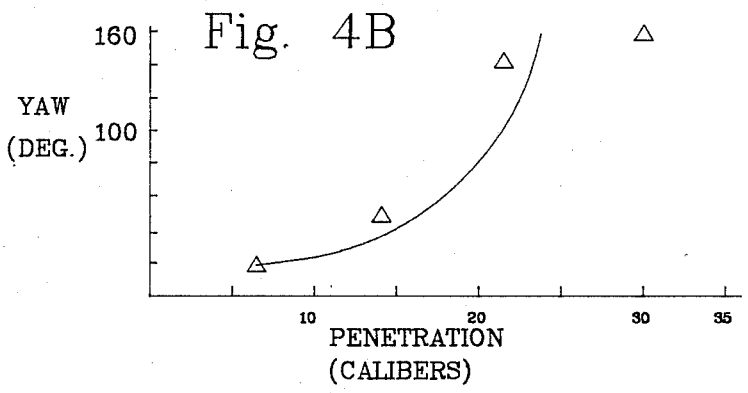

Referring now to FIGS. 4A, 4B and 4C in which the three sets of data points from FIG. 3 are separately plotted, I have discovered that, if a smooth curve is fitted to the data points using only yaw values falling between a lower critical value and an upper critical value, the resulting smooth curves have an almost identical shape, but are displaced in the horizontal direction. The smooth curve is calculated by solving the following differential equation for M and $s_o$:

$$d^2a/d\,s^2 = M \sin a \cos a$$

Where:

M = yaw growth constant $s_o$ = position where lower critical value of yaw occurs and where the other initial condition, da/ds at $s_o$, can be obtained from M and $s_o$ due to an additional restriction on the differential equation.

The position along the path where rapid yaw growth begins is critically dependent upon the conditions existing as projectile 12 (FIGS. 1 and 2) penetrates penetration surface 20. Since these conditions are not available, the position along z axis 16 at which rapid yaw growth begins may vary widely. This appears to account for the fact that the measured yaw at a particular penetration for one projectile varies substantially from that measured for another projectile.

Figure 5:
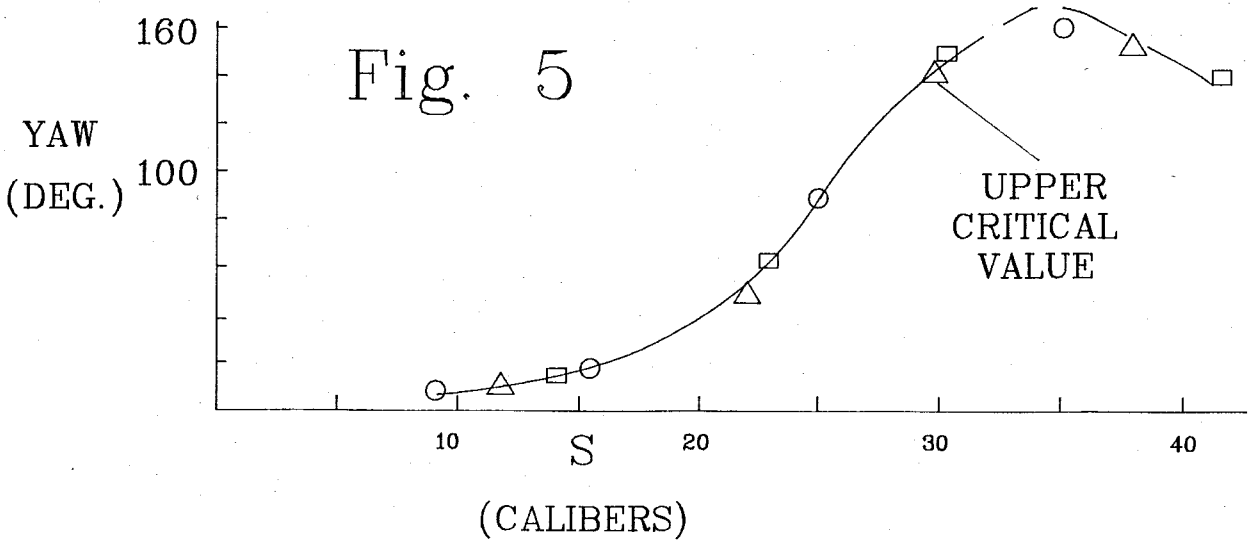
FIG. 5 is a composite curve produced by overlaying lower critical values in the curves of FIGS. 4A, 4B and 4C to produce a dense data set.

I have discovered that, if each smooth curve is extrapolated horizontally to a lower critical value of penetration at which rapid yaw growth begins and, if that value is identified as the origin of a composite curve, then all of the curves can be overlaid one upon the other in a manner which finds virtually all of the data points on a single curve. Such a composite curve is illustrated in solid line in FIG. 5 wherein the abscissa s is the penetration beyond the critical value, in calibers.

The value chosen as the defining lower critical value for the onset of rapid yaw growth may vary with different resisting medium 10 and projectile 12. In the preferred embodiment, the lower critical value is from about 3 to about 10 degrees and, in the most preferred embodiment, the lower critical value is from about 5 to about 7 degrees. The most preferred lower critical value is about 6 degrees.

Beyond the upper critical value, projectile 12 is advancing base forward. Yaw growth constant M no longer applies. In the upper range lie data points in a region wherein yaw growth is slowing or reversing. Attempts to account for these points previously distorted the measured data. With my invention, these points are also found to fall on a smooth curve. Since the present invention permits the superposition of data from a large number of projectile penetrations, the density of data points can be made as great as desired to indicate the true manner in which yaw varies during its travel. With sufficient data points, the variation of yaw angle at large penetrations can be traced as indicated by a dashed line.

Prior-art methods are incapable of predicting yaw growth beyond yaw angles of about 20 degrees whereas the present invention is surprisingly accurate up to yaw angles of as great as 140 degrees.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A method for interpreting yaw data in a projectile traversing a medium comprising the steps of:

firing a first projectile through said medium;

taking a first plurality of measurements of position and yaw angle of said first projectile during its travel through said medium;

solving an equation for said yaw angle using at least some of said first plurality of measurements to derive a first critical lower value of said yaw angle and a first yaw angle constant for said first projectile;

firing a second projectile through said medium;

taking a second plurality of measurements of position and yaw angle of said second projectile during its travel through said medium;

solving said equation for said yaw angle using at least some of said second plurality of measurements to derive a second critical lower value of said yaw angle and a second yaw angle constant for said second projectile; and overlaying said second critical lower value on said first critical lower value to produce a composite curve containing said first and second pluralities of measurements.

2. A method according to claim 1 wherein said first and second critical lower values are equal and from about 3 to about 10 degrees.

3. A method according to claim 2 wherein said first and second critical lower values are equal and from about 5 to about 7 degrees.

4. A method according to claim 1 wherein said at least some of said first plurality include only yaw values lower than a first upper critical value and said at least some of said second plurality include only yaw values lower than a second upper critical value.

5. A method according to claim 4 wherein said first and second upper critical values are equal.

6. A method according to claim 4 wherein said first and second upper critical values are above values at which said first and second yaw angle constants are valid.

7. A method according to claim 1 wherein the step of overlaying includes graphically overlaying first and second curves.

8. A method according to claim 1 wherein said step of overlaying includes analytically overlaying first and second equations representing curves.

9. A method according to claim 1 wherein said equation has the form:

$$d^2a/d\,s^2 = M \sin a \cos a$$

Where:

M = yaw growth constant $s_o$ = position where lower critical value of yaw occurs and where the other initial condition, da/ds at $s_o$, can be obtained from M and $s_o$ due to an additional restriction on the differential equation.

* * * * *